United States Patent Office 2,710,146
Patented June 7, 1955

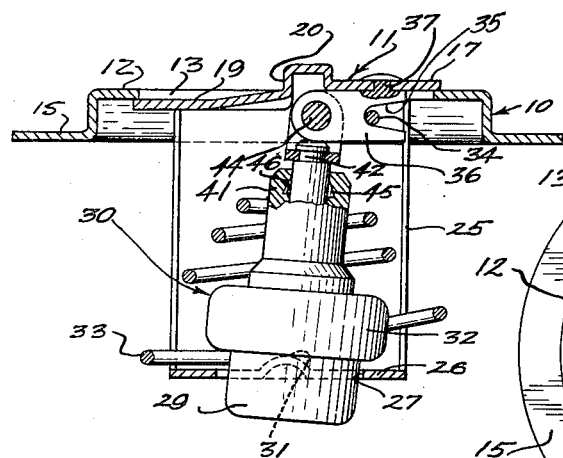

2,710,146

THERMOSTATIC VALVE

Harold B. Drapeau, Oak Park, Ill., assignor to The Dole Valve Company, Chicago, Ill., a corporation of Illinois Application October 14, 1953, Serial No. 386,019

6 Claims. (Cl. 236—34)

This invention relates to improvements in the thermostatically operated valves particularly adapted for use in the cooling systems of internal combustion engines.

Heretofore, thermostatically operated valves for controlling the temperature of the cooling systems of internal combustion engines have been of the butterfly type and have been operated by power types of thermostatic elements in which a piston is extended from a guide cylinder, upon the expansion of a thermal responsive pellet or mass contained within a casing in communication with the guide cylinder. With such thermostatic elements the pellet is contained within the casing by an elastic membrane and plug, which is extensibly movable along the cylinder upon expansion of the thermal responsive medium.

One disadvantage in such elements has been that upon excessive temperature conditions, the elastic membrane is extended beyond its elastic limit and frequently ruptures as it is excessively extended along the guide cylinder. The thermostatic element is then useless. The return spring may then close the valve even though the over temperature conditions persist.

Butterfly types of thermostatic valves operated by power types of thermostatic elements have been designed to lock in an open position upon extensive temperature conditions in order to overcome this disadvantage as in my prior application, Serial No. 181,251 filed August 24, 1950, now Patent No. 2,656,113. With such valves, however, when the excessive temperature conditions are relieved, the piston frequently retractibly moves within its cylinder, with the result that the thermostat will not open the valve when required.

A principal object of my present invention is to overcome these difficulties by providing a thermostatically operated valve, so arranged as to positively lock the valve in a full open position upon excessive temperature conditions.

A further object of my invention is to provide a novel and improved form of butterfly valve for the cooling system of an automotive vehicle in which the valve is biased in a closed position by a spring, and a piston extensible from a cylinder is provided to operate the butterfly valve upon predetermined temperature conditions, and in which a lockout recess is provided in the bore of the cylinder for accommodating tilting of the piston by the return spring and positively engaging the piston when tilted by its return spring and locking the piston from being retracted within the cylinder, and preventing the piston from being ejected from the cylinder.

Still another object of my invention is to provide a novel and improved form of thermostatic unit having a casing for a thermal-responsive medium, a guide cylinder extending from the casing and having a piston movable therealong, in which the bore of the cylinder has a running fit with the piston at its extreme end and is provided with an undercut groove inwardly of its end, maintaining the proper alignment of the piston when in a fully extended position, and retaining the piston from being ejected from the cylinder by the thermal-responsive medium upon an excessive temperature condition, and locking the piston from retractible movement within the cylinder.

These and other objects of my invention will appear from time to time as the following specification proceeds and with reference to the accompanying drawings wherein:

Figure 1 is a top plan view of a butterfly valve constructed in accordance with my invention showing the valve in a closed position;

Figure 2 is a transverse sectional view taken substantially along line II—II of Figure 1;

Figure 3 is a transverse sectional view somewhat similar to Figure 2, but showing the valve in a full flow position; and Figure 4 is a sectional view somewhat similar to Figure 2, but showing the valve in a lockout position upon excessive temperature conditions.

In the embodiment of my invention illustrated in the drawings, an annular valve casing 10 is shown. This valve casing may be suitably attached in any desired manner to a hose connection or water jacket structure of an internal combustion engine, through which cooling fluid is flowing, to control the temperature and flow of cooling fluid by means of a thermostatically operated butterfly valve, indicated generally by reference character 11. The butterfly valve 11 is herein shown as being a shaftless butterfly valve, although it need not be a shaftless valve and may be of various other types of valves desired.

The casing 10 may be made from a metallic stamping, stamped from a sheet or plate of brass or other suitable material, and is herein shown as having a flat upper annular surface 12, the inner margin of which forms a port opening 13. The casing 10 also has a downwardly spaced flange 15, which may abut a shouldered portion (not shown) of the water jacket or hose connection, to secure the valve in place in the cooling system.

The valve opening 13 is generally circular in form, divided into two halves, at the junction of which are spaced inwardly extending nibs 15, 15. The spaces between said nibs form diametrically opposed slots disposed in a straight line which defines generally the pivotal area of the valve 11.

The valve 11 may be made from a metallic stamping and may be like that shown and described in the Brown patent, No. 2,493,336, dated January 10, 1950, and comprises two off-set flat wing portions 17 and 19 extending in opposite directions from the center of the valve in parallel relation with respect to each other. These wing portions are connected together by an intermediate section 20 extending generally at right angles to the wing portions 17 and 19. The height of the intermediate right angled section is determined by the thickness of the annular portion of the casing defining the valve opening, and is such that one wing portion 17 is disposed on the top side of the valve opening 11 and the other wing portion is disposed on the bottom side of the valve opening when the valve is closed, as shown in Figures 2 and 3. In addition, the over all area of the valve 11 is such that when the valve is in a closed position, as shown in Figure 1, it will extend beyond the edge of the valve opening and half of the top edge of the annular portion 12 defining the valve opening 13, and half the bottom edge thereof, to close off the flow of fluid through said opening. Two ears 23, 23 are herein shown as extending oppositely from the wing portions 19 of the valve 11 adjacent the right angled portion 20. These ears extend laterally beyond the margins of the valve opening 13 and are herein shown as abutting the bottom of the annular portion 12 defining the valve opening. The marginal edges of said ears come into engagement with the under surface of annular portion 12 upon complete opening of the valve, to retain said valve in position.

The valve casing 10 also includes a generally U-shaped seating member or cage 25, suitably connected to the annular surface 12 of said valve casing as by riveting and extending therefrom in an upstream direction. The cage 25 is shown as having a transverse bridge 26, which may be formed integrally therewith and which is provided with a central aperture 27, to receive a casing 29 of a thermostatic element 30, connected with the valve 11 for operating the same, as will hereinafter more clearly appear as this specification proceeds.

The transverse bridge 26 is upset adjacent the margins of the opening or aperture 27 at diametrically opposed points, to form rounded bearing nibs 31, 31 upon which rockingly rests an enlarged ring 32, encircling the casing 29 of the thermostatic element 30, and suitably secured thereto. The bridge 26 also forms a seat for a coil spring 33, herein shown as being a conical spirally coiled spring of a relatively few convolutions, converging in diameter from the lower to the upper end thereof. The spring 33 has an integral upper hook-like portion 34, shown as extending through an outwardly opening slot 35 formed in an ear 36 depending from and secured to the bottom of the wing portion 17 of the valve 11 as by a rivet 37. The slot 35 is offset laterally from the pivot of the valve 11, to position the center of force of the spring 33 on the butterfly valve element in a direction to maintain the valve element closed except when opened by the temperature-responsive element 30. The spring 33 may be held in position in its seat on the bridge 26, to bias the valve to closed position in any desired manner.

The thermostatic element 30 may be a well known form of power type of thermostatic element, commonly known as a "Vernet" element and utilizing a temperature-responsive body or pellet in the form of a preformed body contained within the casing 32 and acting against a flexible diaphragm and plug 39, to extend a piston 40 from a guide cylinder 41, with a relatively high degree of pressure, upon predetermined rises in temperature of the cooling water.

The present form of power-type thermostatic element may be like that disclosed in the Vernet Patents Nos. 2,259,846 dated October 21, 1941, and 2,368,181 dated January 30, 1949, so only need herein be described in sufficient detail to point out the novel features of my invention, which will hereinafter more clearly appear as this specification proceeds.

The piston 40 is herein shown as having a reduced diameter upper end portion, recessed adjacent its upper end as indicated by numeral 42, to pivotally connect a yoke 43 thereto. The yoke 43 is shown as extending along opposite sides of the ear 36 and may be snapped or sprung on the recessed or grooved portion 42 of the piston 40. The yoke 43 is shown as being pivotally connected to the ear 36 as by a pivot pin 44, offset from the pivot of the valve 11 in the same direction as the point of connection of the spring 33 thereto.

Referring now in particular to the novel form of lock-out of my invention, enabling the piston to have full engagement with the bore of the cylinder 41 at full flow temperatures of the cooling water and retaining the piston in the cylinder 41 upon excess temperature conditions, and locking the piston in an extended position and positively preventing closing of the valve 11 when opened upon excessive temperature conditions and then cooled, the guide cylinder 41 is shown as being provided in its bore with an undercut lock-out notch or groove 45. The undercut notch or groove 45 is shown as being inclined from the outer end of the guide cylinder 41 which has sliding fit with the piston 40, inwardly along the wall of said cylinder at the general angle the piston 40 will assume when in a jackknifed lock-out position as shown in Figure 4. The undercut notch 45 is also provided with an inner abutment surface 46 at the inner end of said notch, abutted by the inner end of the piston 40 and positively holding said piston from being retractably moved within its cylinder when in the lock-out position shown in Figure 3. The abutment surface 46 is spaced from the end of the guide cylinder 41, a distance substantially less than the diameter of the piston 40, to afford full engagement with said piston for a distance greater than its diameter when the valve is in the full flow position shown in Figure 3, and thus maintain the piston in alignment with its cylinder when the valve is in a full flow position.

It should here be noted with reference to Figures 2 and 3 that during normal operation of the valve 11 and movement thereof from a closed to a full flow position, that the application of force of the spring 33 to the valve element 11 is to one side of the center line of the piston 40. The spring 33 will thus retain said piston in alignment with the bore of the guide cylinder 41 during normal extension of said piston along said cylinder when said piston is opening the valve to its full open position shown in Figure 3.

When, however, the temperature of the cooling fluid becomes excessive, and the piston 40 is extended beyond its full open or flow position, the point of connection of the spring 33 to the valve 11 moves past the center line of the piston 40 to the position shown in Figure 4 and places a sidewise thrust on said piston, moving said piston angularly into engagement with the inclined wall of the undercut notch 45 into the jackknifed position shown in Figure 4. The spring force on the butterfly valve, then being past a dead-center position with respect to the center line of the guide cylinder 41 and on the opposite side of the center of said guide cylinder from its position when the valve is in a full flow position, the spring 33 will maintain the inner end of the piston 40 in this inclined or jackknife position with respect to the guide cylinder 41 in engagement with the inclined face and abutment face 46 of the undercut notch 45. The angular spring force on the piston, biasing the piston in engagement with the vertical wall of the notch 45, against the force of extension of the plug 39, will positively lock the piston 40 from being ejected from the guide cylinder 41 and will positively lock-out the valve in the open position shown in Figure 4.

It may be seen from the foregoing that the lock-out of my invention avoids the difficulties that have been encountered when the piston is ejected from the end of the guide cylinder upon excessive temperature conditions, leaving the valve 11 free to pivot and be closed by the differential in pressure on opposite faces thereof, and positively locks the piston from being ejected from its guide cylinder and also positively locks the valve from closing after being opened by excessive temperature conditions.

The lock-out arrangement of my invention also affords a guide for the piston to the end of the bore of the guide cylinder 41, and thus stabilizes the alignment between the thermostatic element and the butterfly valve, assuring proper alignment of the piston 40 within the guide cylinder and with respect to the butterfly valve in all positions of extension thereof to the full flow position as shown in Figure 3.

It will be understood that modifications and variations may be effected without departing from the scope of the novel concepts of the present invention.

I claim as my invention:

1. In a thermostatic valve particularly adapted for cooling systems for automotive vehicles, an annular valve casing having a port opening, a butterfly valve element pivotally supported on said casing to open and close said port opening, said casing having a seating portion spaced from said port opening, an extensible temperature-responsive element rockingly supported in said seating portion and including a casing for a thermal-responsive medium, a cylinder extending from said casing, a piston extensible from said cylinder and having pivotal connection with said valve, for pivoting the same into an open position, a spring seated on said seating portion and connected with said valve at a point offset from the center thereof, and returning said piston within said cylinder upon normal operation of said valve, and said cylinder having a bore recessed inwardly of the outer end thereof, to accommodate tilting movement of said piston with respect to said cylinder by the force exerted thereon by said spring upon excessive extension of said piston upon excessive temperature conditions, and preventing ejection of said piston from said cylinder and positively locking said valve in an open position.

2. In a thermostatic valve of a type having a butterfly valve pivotally supported on a housing having a port opening to be opened and closed by said valve, said casing having a seating portion spaced from said port opening, a thermostatic control device having a casing rockable on said seating portion and having a cylinder extending therefrom, a piston extensible from said cylinder and having pivotal connection with said valve to pivot the same to an open position upon extension of said piston from said cylinder, a spring connected with said valve at a point spaced laterally from the point of connection of said piston thereto for returning said piston within said cylinder and biasing said valve into a closed position, and said cylinder having a bore having a sliding fit with said piston for the entire length of normal extension thereof, and slidably engaging said piston at the end of said bore when said valve is in a full flow position, said cylinder also having an undercut groove therein engageable by said piston and locking said piston from return within said cylinder upon excessive temperature conditions by the spring force acting on said piston, upon excessive extension thereof from said cylinder.

3. In a thermostatic valve particularly adapted for cooling systems for automotive vehicles, an annular valve casing having a port opening, a butterfly valve element pivotally supported on said casing to open and close said port opening, said casing having a seating portion spaced from said opening on the upstream side thereof, an extensible temperature-responsive element rockingly supported in said seating portion and including a casing rockingly mounted on said seating portion, a cylinder extending therefrom, a piston extensible from said cylinder, a pivotal connection between said piston and said butterfly valve offset from the pivot of said valve, a spring seated on said seating portion and having operative connection with said valve at a point offset laterally from the pivotal axis of said valve on the same side of the axis thereof as the pivotal connection between said piston and valve, and spaced further outwardly from said pivotal connection, said spring exerting a force on said piston in axial alignment with the longitudinal axis thereof during normal operation of said thermostatic element and exerting a lateral tilting force on said piston upon over-travel thereof along said cylinder upon over-temperature conditions, and said cylinder having a bore engaging said piston for a length equal substantially to the diameter of said piston during normal extension thereof, and having an annular undercut groove therein accommodating lateral movement of said piston with respect to said cylinder and locking said piston from being expelled from said cylinder and from retractable movement with respect to said cylinder by engagement with said annular undercut groove by the force of said spring, to positively lock the valve in an open position.

4. In a thermostatic valve particularly adapted for cooling systems for internal combustion engines, an annular valve casing having a port opening, a butterfly valve element pivotally supported on said casing to open and close said port opening, said casing having a seating portion spaced from said opening on the upstream side thereof, an extensible temperature-responsive element rockingly supported in said seating portion and including a casing rockingly mounted on said seating portion, a cylinder extending therefrom, a piston extensible from said cylinder, a pivotal connection between said piston and said butterfly valve offset from the pivot of said valve, a spring seated on said seating portion and having operative connection with said valve at a point offset laterally from the pivotal axis of said valve on the same side of the axis thereof as the pivotal connection between said piston and valve, and spaced further outwardly from said pivotal connection, said spring exerting a force on said piston in axial alignment with the longitudinal axis thereof during normal operation of said thermostatic element and exerting a lateral tilting force on said piston upon over-travel thereof along said cylinder upon over-temperature conditions, and said cylinder having a bore slidably engaging said piston at the outer end thereof and having an annular undercut groove therein extending from a position adjacent the outer end thereof angularly inwardly within the wall of said cylinder and terminating in an inner abutment face engaging the inner end of said piston when tilted by said spring, said angular wall accommodating tilting movement of said piston by said spring upon over-extension of said piston, due to excess temperature conditions, and positively locking said piston from expulsion from said cylinder, and said inner abutment face locking said piston from return movement within said cylinder by the reaction of said spring against said piston.

5. In a power-type of thermostatic element having a casing containing a thermal responsive medium, a cylinder extending from said casing, a piston movable along said cylinder upon expansion of said thermal responsive medium, and having pivotal connection with a member to be angularly driven, and an undercut groove in said cylinder adjacent the outer end thereof, accommodating tilting movement of said piston with respect to said cylinder upon over-extension of said piston from said cylinder and locking said piston from ejection from said cylinder and preventing return of said piston within said cylinder by the reaction of the angular drive force against said piston upon excessive extension of said piston from said cylinder.

6. In a power-type of thermostatic element, a casing containing a thermal responsive medium, a guide cylinder extending from said casing, a piston guided for movement along said cylinder and having running fit therewith for the entire length of normal travel of said piston along said cylinder and having pivotal connection with a member to be angularly driven, and said cylinder having an annular notch formed therein terminating inwardly from the outer end of said cylinder a distance less than the diameter of said piston and having an inclined wall accommodating tilting movement of said piston with respect to said cylinder by the reaction of the angular driving force against said piston upon over extension thereof, and locking said piston from ejection from said cylinder and preventing return movement of said piston within said cylinder.

References Cited in the file of this patent

UNITED STATES PATENTS

| | | |
|---|---|---|
| 2,356,958 | Wangenheim | Aug. 29, 1944 |
| 2,569,359 | Vellinga | Sept. 25, 1951 |